United States Patent [19]

Kerkman et al.

[11] Patent Number: 4,958,117
[45] Date of Patent: Sep. 18, 1990

[54] FREQUENCY CONTROL BASED ON SENSING VOLTAGE FED TO AN INDUCTION MOTOR

[75] Inventors: Russel J. Kerkman, Milwaukee; Brian J. Seibel, Mequon, both of Wis.

[73] Assignee: Allen-Bradley Company, Inc., Milwaukee, Wis.

[21] Appl. No.: 414,684

[22] Filed: Sep. 29, 1989

[51] Int. Cl.⁵ .............................................. H02P 5/40
[52] U.S. Cl. .................................... 318/805; 318/806; 318/803; 363/41; 363/37
[58] Field of Search ................................ 318/727–819, 318/599, 318, 439, 245; 363/34–37, 41

[56] References Cited

U.S. PATENT DOCUMENTS

| | | | |
|---|---|---|---|
| 4,451,771 | 5/1984 | Nagase et al. | 318/799 X |
| 4,463,289 | 7/1984 | Young | 318/723 X |
| 4,680,526 | 7/1987 | Okuyama et al. | 318/805 X |
| 4,680,695 | 7/1987 | Kerkman et al. | 363/160 |
| 4,724,373 | 2/1988 | Lipo | 318/806 X |
| 4,757,248 | 7/1988 | Fujioka et al. | 318/803 X |
| 4,767,976 | 8/1988 | Mutoh et al. | 318/808 |
| 4,792,741 | 12/1988 | Matsuo et al. | 318/805 X |
| 4,800,327 | 1/1989 | Fujioka et al. | 318/806 X |
| 4,808,903 | 2/1989 | Matsui et al. | 318/808 X |
| 4,862,343 | 8/1989 | Nomura et al. | 318/802 X |

OTHER PUBLICATIONS

Mutoh, N., et al., "Tripless Control Methods for General Purpose Inverters," Conference Record 1988 Power Electronics Specialists Conference, Apr. 1988, pp. 1292–1299.

Kerkman, R. J. and Rowan, T. M., "Voltage Controlled Current Regulated PWM Inverters," Conference Record, 1988 IEEE Industry Applications Society Annual Meeting, Oct. 2–7, 1988, pp. 381–387.

Primary Examiner—William M. Shoop, Jr.
Assistant Examiner—Paul Ip
Attorney, Agent, or Firm—Quarles & Brady

[57] ABSTRACT

A frequency control method is incorporated in a motor drive to prevent overcurrent trips when an induction motor is subjected to impact loads or reconnection under load. The drive includes a current regulator loop to control stator current and a voltage regulator loop to control the command to the current regulator. Motor voltage is sensed and a voltage error is developed. This voltage error is processed through a proportional-integral control loop which controls an operating frequency signal to the current regulator. The drive responds during current limit conditions to reduce operating frequency and speed until the current limit conditions subside. The motor can then be re-accelerated up to the desired operating speed.

4 Claims, 2 Drawing Sheets

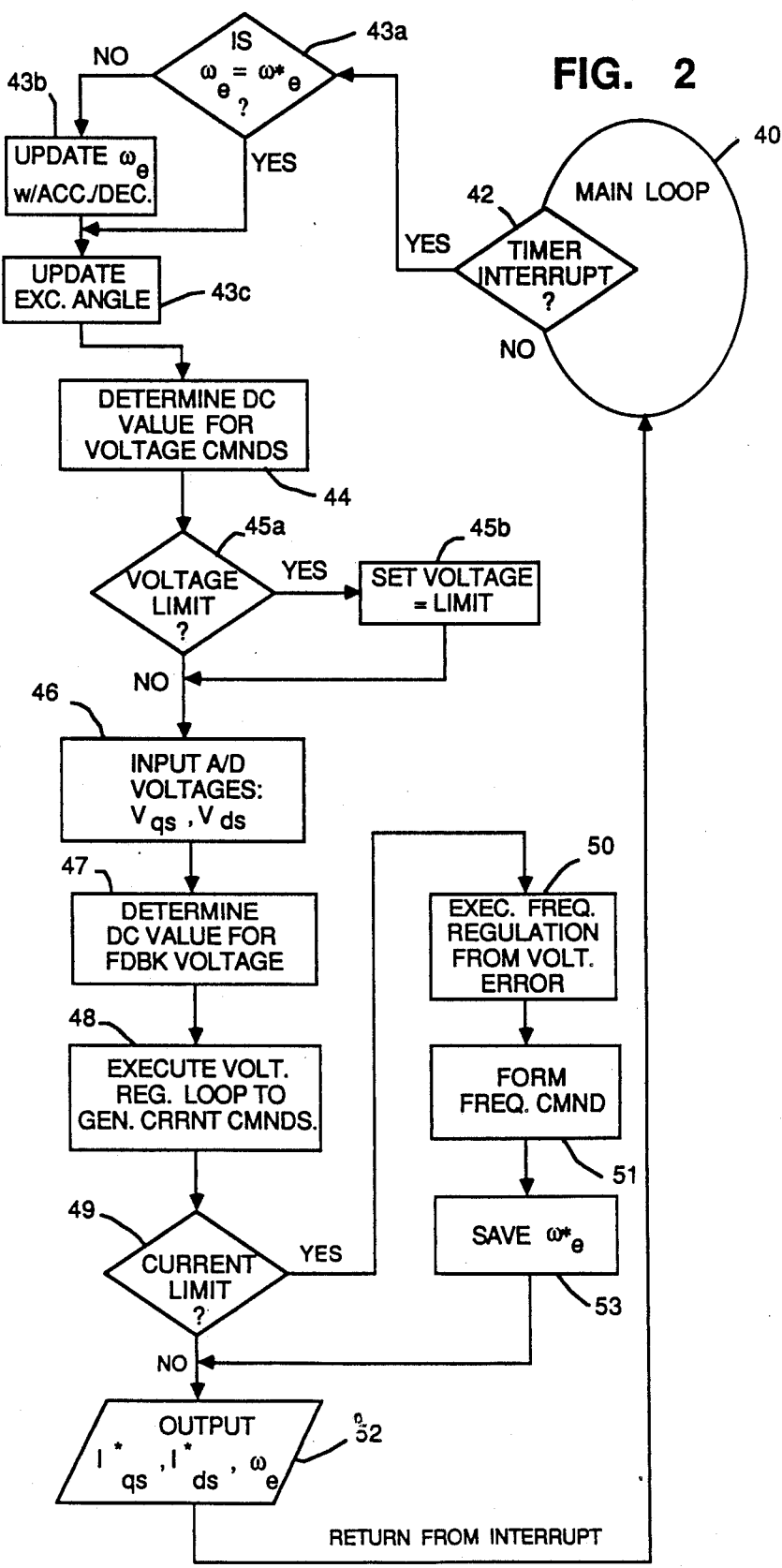

FREQUENCY CONTROL BASED ON SENSING VOLTAGE FED TO AN INDUCTION MOTOR

BACKGROUND OF THE INVENTION

1. Field of the Invention

The field of the invention is electronic, motor drives for variable speed control of AC induction motors, and more particularly, motor drives which do not utilize direct speed sensing through a tachometer, position encoder or resolver.

2. Description of the Background Art

In high performance drives with speed sensing, speed feedback from the rotor is used in controlling the torque and speed at which the motor is operated. Motor parameters such as inductance (L) and resistance (R) of stator and rotor windings have been used as inputs for tuning the current and speed-torque control loops.

While techniques are known to reduce the number of motor parameters which must be evaluated, they have not altogether eliminated some motor parameter inputs in a high performance drive. The motor parameters must be obtained from the manufacturer of the motor or determined through rigorous testing of the motor.

Lower cost drives have included controls of the open loop type in which external speed sensing equipment is not utilized and in which knowledge of motor parameters such as inductance (L) and resistance (R) is not required. Such a drive has been disclosed in Rowan et al., Ser. No. 07/326,483 filed Mar. 20, 1989, and entitled "Open Loop Motor Control with Both Voltage and Current Regulation." This drive Provided an inner current regulator loop to control stator current. An outer voltage control loop was used to control stator voltage by controlling the command fed to the current regulator loop. The voltage controller generated a voltage command based on user-specified volts/hertz and accel/decel parameters. This command was compared with the actual motor voltage which was sensed at the outputs of the current regulator. The difference between the commanded and actual voltage became an error signal for controlling the current command signal.

When a motor is subjected to a sudden and substantial increase in load or when the motor drive is reconnected to a motor under load, the drive may encounter transients that cause nuisance tripping (interruption of power). These conditions are encountered in motor control applications in the wood cutting, metal forming and fiber and paper industries.

High performance motor controls provide some type of torque, speed or slip control to handle the special conditions described above. It is therefore an object of the present invention to provide an open loop control with improved response to these conditions.

SUMMARY OF THE INVENTION

The invention relates to an open loop motor drive which controls frequency and speed of an induction motor without directly sensing rotor speed using tachometers, position encoders or resolvers.

In the method of the invention, a voltage signal is applied to the induction motor in response to an inverter voltage control signal. The inverter voltage control signal is generated in response to the current command signal and in response to a signal representing the electrical operating frequency ($\omega_e$).

The current command signal is generated in response to a difference between a voltage command magnitude (V*) and a voltage feedback magnitude ($V_{MAG}$). The voltage command magnitude (V*) is determined in response to operator inputs. The voltage feedback magnitude ($V_{MAG}$) is determined in response to sensing the inverter voltage control signal, which is representative of voltage at the motor terminals.

The response of the current command to the voltage feedback magnitude is limited when the current command reaches a predetermined limit; and in response to this current limit action, the operating frequency signal ($\omega_e$) is regulated in response to the difference between the voltage command magnitude and the voltage feedback magnitude. This provides a form of speed control for an open-loop motor drive.

The apparatus of the invention includes a voltage source inverter, a current regulator, and a voltage regulator. The voltage regulator is preferably implemented in a digital processing means which may include analog-to-digital conversion circuitry and other peripheral circuitry.

The current regulator generates the inverter voltage control signal in response to (1) the current command signal and (2) the operating frequency signal $\omega_e$. The digital processing means determines a voltage reference (V*) based on user inputs, and under normal operating conditions would also determine the operating frequency, $\omega_e$, based on user inputs including the operating frequency command signal $\omega^*_e$. The motor voltage is sensed in the form of analog signals which are converted to digital signals and resolved into a magnitude for the feedback voltage ($V_{MAG}$) by the digital processing means. The digital processing means then performs the voltage regulation loop by comparing the voltage command magnitude (V*) and the voltage feedback magnitude ($V_{MAG}$) and generating the current commands. When the current command would exceed a predetermined limit, which would occur under impact load, or reconnect-under-load conditions, a frequency regulator overrides normal frequency control to adjust the electrical operating frequency ($\omega_e$) in relation to the difference between the voltage command magnitude (V*) and the voltage feedback magnitude ($V_{MAG}$). This reduces speed under impact load or reconnect-under-load conditions until voltage and current levels are reduced to suitable levels. The motor can then be re-accelerated to the desired operating frequency.

In adjusting the electrical operating frequency ($\omega_e$) in relation to the difference between the voltage command magnitude (V*) and the voltage feedback magnitude ($V_{MAG}$), the frequency controller generates an operating frequency command signal ($\omega^*_e$) which overrides the operator input for that command. The operating frequency command signal ($\omega^*_e$) is then compared with the operating frequency signal ($\omega_e$). If there is a difference between the present operating frequency and the commanded operating frequency, a portion of a microprocessor program is executed to apply either an acceleration or deceleration parameter to change the operating frequency ($\omega_e$) to reduce the voltage error. The acceleration parameter is applied to increase $\omega_e$ and the deceleration parameter is applied to decrease $\omega_e$.

Various objects and advantages besides those discussed above shall be apparent from the description of the preferred embodiments of the invention which follow. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

BRIEF DESCRIPTION OF THE DRAWINGS

FIG. 2 is a flow chart of a subroutine executed by a processing means in FIG. 1 in carrying out the invention.

DETAILED DESCRIPTION OF THE PREFERRED EMBODIMENTS

Figure 1:
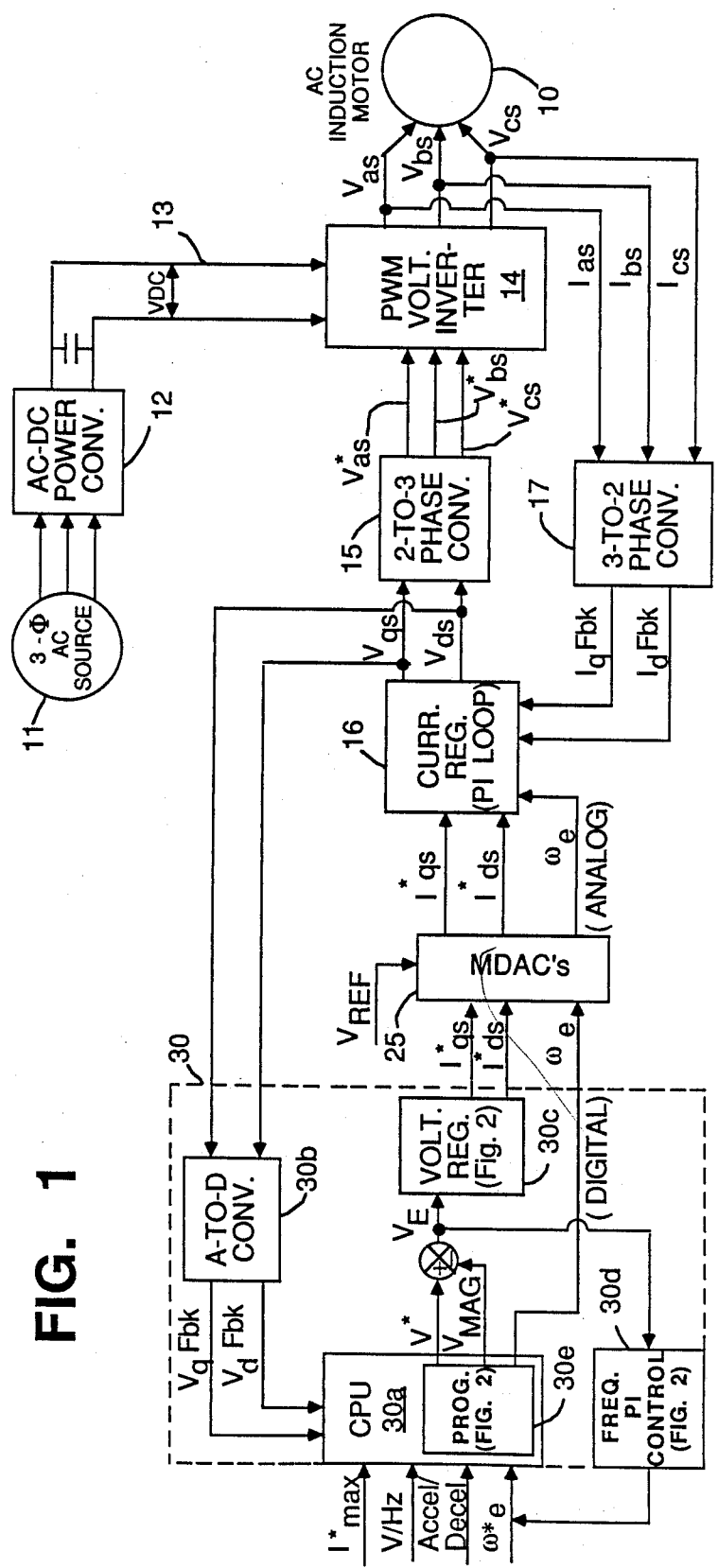
FIG. 1 is a block diagram of a motor drive for carrying out the invention.

Referring to FIG. 1, the invention is incorporated in a motor control for an AC induction motor 10. The motor control (also called a "drive") receives power at a line frequency of 60 Hz from a 3-phase AC power source 11. The three phases of the power source are connected to an AC-DC power converter 12. The converter 12 rectifies the alternating current signals from the AC source 11 to produce a DC voltage (VDC) on a DC bus 13 that connects to a power inputs on a voltage source inverter, which in this preferred embodiment is a pulse width modulation (PWM) voltage inverter 14. The AC source 11, the AC-DC power converter 12 and the DC bus 13 provide a DC source for generating a DC voltage of constant magnitude. The converter 12, DC bus 13 and inverter 14 form a power section of the drive.

The PWM inverter 14 includes a group of switching elements which are turned on and off to convert the DC voltage from bus 13 to pulses of constant magnitude.

The pattern of a pulse train from the PWM inverter 14 is characterized by a first set of positive-going pulses of constant magnitude but of varying pulse width and by a second set of negative-going pulses of constant magnitude but of varying pulse width. The RMS (root mean square) value of this pulse train pattern approximates one cycle of a sinusoidal signal which is characteristic of an AC waveform. The pattern is repeated to generate additional cycles of the AC waveform.

The frequency and magnitude of the resultant AC power signals to the motor are controlled by AC phase voltage command signals. The PWM voltage inverter 14 receives three balanced AC phase voltage command signals, $V^*_{as}$, $V^*_{bs}$ and $V^*_{cs}$ which vary in phase by 120°, and the magnitude and the frequency of these signals determines the pulse widths and the number of the pulses in pulse trains $V_{as}$, $V_{bs}$ and $V_{cs}$ which are applied to the terminals of the motor. The asterisk in the first set of signals denotes a "command" signal. The "s" subscript in both sets of signals denotes that these signals are referred to the stationary reference frame. Phases "a" "b" and "c" are the line-to-neutral voltage signals incorporated in the line-to-line voltages observed across the motor terminals.

The AC phase voltage command signals, $V^*_{as}$, $v^*_{bs}$ and $V^*_{cs}$ are produced as a result of a 2-phase to 3-phase conversion which is accomplished with a 2-to-3 phase converter 15. The input signals to this circuit are inverter voltage control signals $V_{qs}$ and $V_{ds}$, which are sinusoidal AC signals having a magnitude and a frequency. These signals are related to a d-q reference frame in which the phase angle of the q-axis component and the phase angle of the d-axis component are 90° apart.

The AC inverter voltage control signals $V_{qs}$ and $V_{ds}$ are output signals from a synchronous current regulator 16. The details of this circuit 16 have been previously shown and described in Kerkman et al., U.S. Pat. No. 4,680,695 issued July 14, 1987. For a further explanation of the formulas and theory for the synchronous current regulator, reference is made to Rowan and Kerkman, "A New Synchronous Current Regulator and an Analysis of Current Regulated PWM Inverters" *IEEE Trans. on Industry Applications* IAS Vol. 1A-22, No. 4, July-August, 1986, pp. 678-690.

The synchronous current regulator 16 includes a proportional-integrator (PI) loop with summing inputs. At one summing input, an AC current command signal for the q-axis component, $I^*_{qs}$, is algebraically summed with an $I_q$ Fbk signal for the q-axis. At a second summing input, an AC current command signal for the d-axis component, $I^*_{ds}$, is algebraically summed with an $I_d$ Fbk signal for the d-axis.

To obtain the $I_q$ Fbk and $I_d$ Fbk signals, current sensing devices (not shown) are used to sense the phase currents $I_{as}$, $I_{bs}$ and $I_{cs}$ flowing to the motor terminals. These signals are fed back to a 3-to-2 phase converter 17 for converting these signals to feedback signals $I_q$ Fbk and $I_d$ Fbk that are related to the d-q frame of reference. Such phase converter circuits are known in the art.

The current regulator 16 is controlled by current command signals $I^*_{qs}$ and $I^*_{ds}$ and by an operating frequency signal ($\omega_e$), which is the electrical operating frequency in radians for both the q-axis and d-axis branches of the circuit 16. With these input signals, the synchronous current regulator 16 controls the inverter voltage control signals $V_{qs}$ and $V_{ds}$ at its outputs in response to current error, while maintaining the vector relationship of the output signals to the q-axis and the d-axis.

The current command signals $I^*_{qs}$ and $I^*_{ds}$ and operating frequency signal, $\omega_e$, are digital data outputs from a microelectronic processing circuit 30. These digital outputs are converted to analog signals by three multiplying digital-to-analog converter (MDAC) circuits 25. A commercial version of such a circuit is the AD 7524 multiplying digital-to-analog converter offered by Analog Devices, Norwood, Mass.

The CPU 30a generates digital values for $I^*_{qs}$ or $I^*_{ds}$ which are instantaneous values of AC signals in the form of $I^* \cos \theta_e$ and $-I^* \sin \theta_e$, respectively. The series of digital values follows the functions $I^* \cos \omega_e t$ and $-I^* \sin \omega_3 t$. These values are multiplied by $V_{REF}$ to arrive at the proper signal level for input to the synchronous current regulator 16. Each MDAC circuit 25 multiplies a voltage reference signal, $V_{REF}$, by a series of digital values for $I^*_{qs}$ or $I^*_{ds}$. The signals resulting from the conversion through MDAC circuits 25 are designated as current commands $I^*_{qs}$ and $I^*_{ds}$ and are AC signals to the current regulator 16.

In this embodiment, a synchronous current regulator 16 combines the AC input signals for $I^*_{qs}$ and $I^*_{ds}$ signals with a DC signal for operating frequency $\omega_e$ to generate $V_{qs}$ and $V_{ds}$ signals, which are signals at the stator operating frequency. The speed of the motor is controlled by controlling stator operating frequency. This type of control does not precisely control slip or motor speed, however, it has been found suitable for decreasing the speed of the motor in response to impact load conditions and overcurrent transients.

Voltage regulation is performed by a microelectronic processing circuit 30, which includes a CPU 30a and preferably also includes A-to-D converters 30b, and a voltage-responsive PI regulator 30c. In alternative embodiments, the A-to-D converters 30b may be discrete digital circuits. The PI regulator 30c performs a proportional-integral (PI) control loop function on the voltage error obtained by algebraically summing (taking the difference between) the magnitude of the sensed motor voltage, $V_{MAG}$, and the magnitude of the commanded motor voltage V*. The block 30c can be executed through a hardware circuit, but is preferably performed as part of a program 30e for the CPU 30a. This program may be stored in a memory (not shown) associated with the CPU 30a. The detailed steps in the program 30e are represented in FIG. 2.

The CPU 30a calculates a motor voltage command value V* based on one of several switch-selectable rates of acceleration and deceleration (accel/decel rates) and voltage/hertz (V/Hz) ratio, which is a multiplier applied to the frequency determined by the accel/decel rates. The voltage/hertz ratio (V/Hz) is set to a predetermined ratio by connecting a jumper wire on an input interface so that an input signal is read by the CPU 30a. Another input to the CPU 30a in FIG. 1 represents inputs from two potentiometers which determine a range for the frequency command $\omega^*_e$, such as 0–90 Hz, for example, but expressed in radians ($2\pi \times$ frequency in Hz). Within this range, the CPU 30a generates various values of $\omega_e$ as the motor is brought up to a rated frequency such as 60 Hz, for example.

The CPU 30a senses a voltage drop at the motor terminals by sensing a drop in voltages $V_{qs}$ and $V_{ds}$ at the outputs of the synchronous current regulator 16. A voltage drop at the motor terminals is reflected back to the outputs of the current regulator 16. A voltage feedback loop is closed around the synchronous current regulator 16 with the inputs to the regulator 16 being controlled by the voltage regulator implemented through CPU 30a.

If a load disturbance calls for greater than maximum current ($I^* = 1.5 \times I_{rated}$), this is detected by the CPU 30a by examining the current commands $I^*_{qs}$ and $I^*_{ds}$. The level of the current limit is set through an input for the CPU 30a designated $I^*_{max}$ in FIG. 1. The current limit is selected as something less than the current which would cause the operation of an overload protection circuit and the shut down or other substantial interruption of motor operation. The CPU 30a responds to detection of the current limit to execute a frequency control portion of its program 30d to control the frequency command ($\omega^*_e$), and to ultimately control operating frequency ($\omega_e$), in response to voltage changes. The frequency command signal ($\omega^*_e$) controls the operating frequency signal through a portion of the program 30e executed by the CPU 30a. FIG. 2 shows the program represented by blocks 30c, 30d and 30e in FIG. 1. As seen in FIG. 2, the program 30e includes a main program loop 40 for handling background functions. As represented by the "YES" branch from decision block 42, when a timer, which may be a programmable hardware timer, or a simply a timing routine in the program, times out and generates an interrupt signal, the CPU 30a branches to an interrupt portion of the microprocessor program.

As represented by decision block 43a, the CPU 30a compares the frequency command signal ($\omega^*_e$) with the present operating frequency signal ($\omega_e$). If these are not equal, this signifies that the value of the operating frequency ($\omega_e$) must be updated according to the following equation (1), which is shown with the related equation (2) for updating the phase angle of excitation, $\theta_e$:

$$\omega_e(t) = \omega_e(t-1) + \Delta\omega_3 \quad (1)$$

$$\theta_e(t) = \theta_e(t-1) + \omega_e(t) \Delta T \quad (2)$$

In equations (1) and (2), (t) is a present time and (t−1) is a previous time. The accel/decel rate determines $\Delta\omega_e$ as a function of time. If $\omega^*_e$ is greater than $\omega_e$, then the acceleration factor is applied until $\omega_e$ has come up to the commanded frequency. If $\omega^*_e$ is less than $\omega_e$, then the deceleration factor is applied until $\omega_e$ has dropped down to the commanded frequency. Process block 43b represents the instructions that are executed by the CPU 30a to update the operating frequency value $\omega_e$.

Then, as represented by process block 43c, the phase angle is updated. $\theta_e$ is the phase angle or instantaneous value for a function of the form sin $\theta_e(t)$, and $\Delta T$ is the elapsed time since the last update.

In the instance where $\omega^*_e$ is equal to $\omega_e$ as a result of the comparison represented by decision block 43a, no adjustment of the operating frequency is necessary, and the CPU 30a skips block 43b and proceeds to execute process block 43c to update the excitation angle.

After updating frequency and phase angle as necessary, the CPU 30a executes instructions represented by process block 44 to determine a value for a motor voltage command V* according to the following equation:

$$V^* = \omega_e(t)/2\pi \times (V/Hz) \quad (3)$$

where (V/Hz) is the volts/hertz ratio.

This value is compared against a voltage limit $V_{max}$ as represented by decision block 45a. If V* is greater than $V_{max}$, as represented by the "YES" result, then V* is reduced to $V_{max}$ as represented by process block 45b. If V* is not greater than $V_{max}$, as represented by the "NO" result, the program proceeds directly to process block 46.

The CPU 30a executes instructions represented by process block 46 to read the digital voltage feedback signals $V_q$ Fbk and $V_d$ Fbk. As seen in FIG. 1, the A-to-D converters 30b receive the analog feedback signals $V_{qs}$ and $V_{ds}$ from the outputs of the synchronous current regulator 16, and convert these to the digital values $V_q$ Fbk and $V_d$ Fbk. These are read by the CPU 30a and saved in RAM memory (not shown).

Next, as represented by process block 47, the CPU 30a executes a subroutine which retrieves the digital values for $V_{qs}$ and $V_{ds}$ from memory, squares each value, sums the two squared values and then takes the square root of the sum to determine a single magnitude for a feedback voltage, which shall be referred to as $V_{MAG}$.

The CPU 30a then proceeds to execute instructions represented by process block 48 to generate current commands $I^*_{qs}$ and $I^*_{ds}$ for the current regulator. This was previously disclosed in Rowan et al., Ser. No. 07/326,483 filed Mar. 20, 1989, and entitled "Open Loop Motor Control with Both Voltage and Current Regulation."

In this block 48 also illustrated and described as block 30d in FIG. 1, the voltage-limited value of V* and the value for $V_{MAG}$ are algebraically summed and the error signal is an input to a proportional-integrator (PI) control loop to generate outputs $I^*_{qs}$ and $I^*_{ds}$.

The current commands $I^*_{qs}$ and $I^*_{ds}$ are applied to a pair of MDAC circuits 25 and multiplied by $V_{REF}$ to convert the digital outputs of the microelectronic processing circuit 30 to analog signals for input to the current regulator 16.

The voltage-limited value of $V^*$ and the value for $V_{MAG}$ are also inputs to a PI loop portion of the program 30d that controls $\omega^*_e$, the operating frequency command. To determine whether this portion of the program is applicable, the CPU 30a executes instructions represented by decision block 49 to determine whether the drive has reached a current limit condition. In executing this check, the CPU 30a examines the current commands $I^*_{qs}$ and $I^*_{ds}$, and performs the necessary calculations and comparison to $I^*_{max}$.

If current limit has been reached, as represented by the "YES" result from decision block 49, then program instructions represented by process blocks 50 and 51 are executed to perform the frequency PI regulation loop according to the following equations:

$$I_{integ}(t) = I_{integ}(t-1) + K_I(V_{MAG} - V^*) \quad (4)$$

$$\omega^*_e = I_{integ}(t) + K_p(V_{MAG} - V^*) \quad (5)$$

where $I_{integ}(t)$ is the value of an integral at some time "t" and $I_{integ}(t-1)$ is the value of the integral at some earlier time "t−1", where $K_I$ is a gain factor applied to the voltage error $(V_{MAG} - V^*)$, where $V_{MAG} - V^*$ is the voltage error for one of the two directions of motor shaft rotation, and where $K_p$ is a proportional gain factor applied to the voltage error.

It is noted that for one of the two directions (clockwise or counterclockwise) of motor shaft rotation, the voltage difference for frequency regulation involves subtracting $V^*$ from $V_{MAG}$, which is the opposite in sign from the voltage difference illustrated for the voltage regulator 30c in FIG. 1.

After the digital value of $\omega^*_e$ is determined, it is saved in memory, as represented by process block 53, for examination in decision block 43a at the beginning of the next interrupt cycle. The operating frequency $\omega_e$ for the present interrupt cycle becomes an output to one of the MDAC's 25 along with the commands for $I^*_{qs}$ and $I^*_{ds}$ developed through execution of process block 48. The output of these three signals, $I^*_{qs}$, $I^*_{ds}$ and $\omega_e$ is represented in FIG. 2 by I/O block 52. The CPU 30a then returns from the interrupt routine to the main loop routines 40. If current limit has not been reached as represented by the "NO" result branch from decision block 49, then frequency regulation according to the invention is not invoked.

A specific motor control system of this description exhibits improved response in two situations. In the first situation, an impact load is added to the motor. In the second situation, the drive is disconnected from a motor and then reconnected to a spinning motor under some load.

In a computer simulation of the first situation, an impact load of 30 newton-meters is applied at 0.2 seconds and removed at 1.2 seconds. During the overload period, the processing circuit 30 limits $I^*_{qs}$ and $I^*_{ds}$ to limit the stator current to 1.5 times the rated value or 25 amps. Limiting the stator current causes the rotor velocity and terminal voltage to decrease. The frequency controller senses the reduction in terminal voltage and reduces the commanded operating frequency $\omega^*_e$ until the voltage error eliminated. This action reduces current to resume normal operation below the current limit level and without invoking further operation of the voltage-responsive frequency controller.

In a second computer-simulated situation, the reconnection of the inverter to a rotating motor under load, following power interruption, may produce a large current transient that would cause operation of a power-interrupting current protection device. If a motor under load is disconnected from power at 0.3 seconds and reconnected at 1.0 seconds, rotor velocity decreases as a function of inertia and the voltage decays to near zero by the time of reconnection. At reconnection, the voltage and commanded frequency would conventionally be the same as at disconnection, which may cause a large stator current transient.

With the present invention, the current limit on reconnection is sensed by the processing circuit 30 which again limits $I^*_{qs}$ and $I^*_{ds}$ to limit stator current. The frequency controller kicks in to reduce the commanded frequency as a response to the decrease in speed of the motor during disconnection. The reduction in frequency causes a reduction in commanded motor voltage, and when the commanded frequency reaches the rotor velocity, the voltage becomes the rated voltage for that speed. This reduces stator current to a rated level. When voltage and current have been reduced to rated levels for the reduced speed, the motor can again be accelerated to a desired operating frequency and speed.

While the invention is advantageously applied in the above two situations, it is also more generally applicable to any abnormal operating condition resulting in current limit operation of the drive.

This description has been by way of example. Those familiar with the art will recognize that various details may be modified in arriving at other detailed embodiments that come within the scope of the invention. Therefore, to apprise the public of the scope of the invention and the embodiments covered by the invention, the following claims are made.

We claim:

1. A method for improved control of current to an induction motor without sensing the rotational speed of the motor, the method comprising:

controlling an inverter voltage control signal to further control a voltage signal to be applied to the induction motor;

determining a voltage feedback magnitude in response to sensing of the inverter voltage control signal;

generating a voltage command magnitude in response to operator inputs;

generating a current command signal in response to a difference between the voltage command magnitude and the voltage feedback magnitude;

generating the inverter voltage control signal in response to the current command signal and in response to an operating frequency signal;

limiting the magnitude of the current command signal when the current command reaches a predetermined limit; and in response to limiting action on the current command, generating an operating frequency signal to further control the inverter voltage control signal in response to the difference between the voltage command magnitude and the voltage feedback magnitude.

2. A motor control for improved control of current to an induction motor without sensing the rotational speed of the motor, the motor control comprising:

means for generating a voltage command magnitude in response to operator inputs;

voltage regulation means for generating a current command signal in response to a difference between the voltage command magnitude and a voltage feedback magnitude;

current regulation means for generating an inverter voltage control signal in response to the current command signal and in response to an operating frequency signal;

a voltage source inverter with outputs for electrical connection to the terminals on the induction motor, the voltage source inverter being responsive to a DC voltage signal from a DC power source and responsive to the inverter voltage control signal from the current regulation means to generate a voltage signal to be applied to the induction motor;

voltage feedback means for determining a voltage feedback magnitude in response to sensing of the inverter voltage control signal;

current limit means for detecting when a magnitude of the current command has reached a predetermined current limit; and frequency regulation means responsive to the detection of the current command limit for controlling the operating frequency signal in response to the difference between the voltage command magnitude and the voltage feedback magnitude to reduce the speed of the motor in response to a sudden increase in load.

3. The motor control of claim 2, wherein the frequency regulation means generates a frequency command signal that is responsive to a difference between a digital voltage command value and a digital voltage feedback value; and further comprising means for converting the frequency command signal to the operating frequency signal for input to the current regulator means.

4. A motor control for improved control of current to an induction motor without sensing the rotational speed of the motor, the motor control comprising:

means for generating a motor voltage command magnitude in response to a predetermined acceleration/deceleration rate and in response to a predetermined volts/hertz ratio;

voltage regulation means for generating current command signals in response to a difference between the voltage command magnitude and a voltage feedback magnitude;

current regulation means for generating inverter voltage control signals in response to current command signals;

a voltage source inverter with outputs for electrical connection to the terminals on the induction motor, the inverter being responsive to a DC voltage signal from a DC power source and responsive to inverter voltage control signals from the current regulation means to generate voltage signals to be applied to the induction motor;

means for sensing inverter voltage control signals that are responsive to changes in voltage at the terminals of the induction motor;

conversion means coupled to the means for sensing, for converting the signals which are responsive to changes in voltage at the terminals of the induction motor to a corresponding plurality of digital voltage feedback values;

means for calculating a magnitude for motor voltage feedback in response to plurality of digital voltage feedback values;

means for algebraically summing the voltage command magnitude and the motor voltage feedback magnitude to generate a motor voltage error signal;

means for detecting when a magnitude of current command has reached a predetermined limit;

frequency regulation means responsive to means for detection of the current command limit for controlling an operating frequency signal to the current regulation means in response to the motor voltage error signal; and wherein the current regulation means controls the inverter voltage control signal in response to the current command signal and in response to the operating frequency signal to decrease the speed of the motor in response to substantial loads on the motor.

* * * * *

UNITED STATES PATENT AND TRADEMARK OFFICE
CERTIFICATE OF CORRECTION

PATENT NO. : 4,958,117
DATED : September 18, 1990
INVENTOR(S) : Russel J. Kerkman, et al.

It is certified that error appears in the above-identified patent and that said Letters Patent is hereby corrected as shown below:

Column 4, line 49    "$\omega_3 t$", should be --$\omega_e t$--.

Column 6, Eq. 1    "$\omega_3$", should be --$\omega_e$--.

Signed and Sealed this

Twelfth Day of May, 1992

Attest:

DOUGLAS B. COMER

*Attesting Officer*      *Acting Commissioner of Patents and Trademarks*